United States Patent [19]

May

[11] 3,728,598

[45] Apr. 17, 1973

[54] BI-DIRECTIONAL ENERGIZING CIRCUIT FOR A STEPPING MOTOR WITH MEANS TO PREVENT CONDUCTION IN ONE COIL UNIT PREVIOUSLY ENERGIZED COIL CONDUCTION IS EXTINGUISHED

[75] Inventor: Joe Cyril May, Cheshire, Conn.

[73] Assignee: The Superior Electric Company, Bristol, Conn.

[22] Filed: Nov. 2, 1970

[21] Appl. No.: 86,054

[52] U.S. Cl. .................................. 318/696, 318/439
[51] Int. Cl. ............................................. H02k 29/00
[58] Field of Search ................... 318/254, 138, 696, 318/685, 439

[56] References Cited

UNITED STATES PATENTS 3,585,474  6/1971  Kobayashi et al. .................. 318/254
3,529,220  9/1970  Kobayashi et al. .................. 318/138
3,581,182  5/1971  Comstock ........................... 318/68 S
3,453,514  7/1969  Rakes et al. ...................... 318/254 X Primary Examiner—G. R. Simmons
Attorney—Johnson & Kline

[57] ABSTRACT

A stepping motor having its stator windings connected into two phases is advanced one step by reversing the direction of current flow in one of the phases. Each phase is connected to a D.C. source by a pair of paths with each path directing current in a different direction through the phase. The paths are alternately shiftable from conducting to non-conducting with the shift of a path to being conducting being delayed until current flow from the path shifted to non-conducting is essentially zero to prevent short circuiting between the paths.

5 Claims, 5 Drawing Figures

BI-DIRECTIONAL ENERGIZING CIRCUIT FOR A STEPPING MOTOR WITH MEANS TO PREVENT CONDUCTION IN ONE COIL UNIT PREVIOUSLY ENERGIZED COIL CONDUCTION IS EXTINGUISHED

In U.S. Pat. No. 3,077,555 assigned to the assignee of the present invention there is disclosed a control circuit consisting of a plurality of mechanical switches for changing the energization of the stator windings of a stepping motor. In U.S. Pat. No. 3,280,395, also assigned to the assignee of the present invention, there is disclosed a motor control circuit using electronic components for also changing the energization of the stator windings of a stepping motor. Stepping motors that are capable of being controlled by both circuits are essentially identical with each having a plurality of poles, with there being a winding for each pole and with the windings being connected into two phases. The only difference between the motors is that in the former instance there is a unitary winding, i.e., a single coil on each pole, and it is completely energized, while in the latter instance each pole winding consists of two separate coils with only one coil being energized at a time. The latter motor is sometimes referred to as a bifilar motor and the magnetic polarity of a pole is set by which coil of the winding is energized, with one coil causing an N polarity and the other coil an S polarity.

While both circuits have been found to operate satisfactorily, the use of mechanical switches limits the frequency at which the changes of energization can occur, and hence the speed of the motor. Also the bifilar motor when operated by the motor control circuit only is capable of using one-half of the available windings, thus tending to reduce the available torque, at least over its low speed range, as compared to having both halves of the winding continually energized.

It is accordingly an object of the present invention to provide an energizing circuit for a stepping motor having unitary windings which uses electronic solid state components to change the direction of current in the stator windings in the motor, rather than mechanical switches, to enable faster operation of the motor.

Another object of the present invention is to provide an energizing circuit for a stepping motor having bifilar windings in which both portions of the windings are continually energized to thereby enable the available torque of the motor to be increased at least for the lower stepping speeds without increasing the losses in the motor.

A further object of the present invention is to provide an energizing circuit for a stepping motor which may be used with a motor having either unitary or bifilar windings.

Still another object of the present invention is to achieve the above objects with a bi-directional energizing circuit which consists of electronic components which are relatively economical to manufacture, reliable in performance, durable in use and capable of being used with presently existing stepping motors and operating circuits therefor.

The bi-directional energizing circuit of the present invention, while usable in other and different applications, has particular utility when used to control the energization of the windings of a stepping motor. It is specifically herein shown as being connected between a substantially constant current unidirectional power source, such as shown in U.S. Pat. No. 3,505,579 (assigned to the assignee of the present invention), and a stepping motor as disclosed in the two above-noted patents. The energizing circuit reacts to information from the pulse-to-step portion of the motor control circuit, such as shown in the above-noted U.S. Pat. No. 3,280,395 to produce movement of the stepping motor in the same direction and at the same frequency as commanded by the pulse-to-step portion. The stepping motor may be of either the unitary or bifilar winding construction, with the latter having both coils connected in parallel so that, when energized, all the winding on a pole is energized. The stator windings are interconnected to form two phases, with a change of direction of current in one of the phases producing an incremental movement of the motor and with the changes being alternated between the phases.

The bi-directional energizing circuit includes a pair of conducting paths connected to each phase with the paths being so connected to the power supply that when one of the pair is rendered conducting, unidirectional current flows in one direction through its associated phase, while when the other of the pair of paths is rendered conducting, unidirectional current flows through the phase in the other direction. However, as each of the paths includes transistors of relatively high power capacity and a signal, terminating conduction in a path does not instantaneously open the path because there is a slight time delay during which the transistor conducts because of inherent storage and fall time. Though the pulse-to-step circuit effectively directs the bi-directional energizing circuit to instantaneously shift the conductivity in the paths, if the paths also reacted instantaneously, then a short circuit would develop across the power supply to cause malfunctioning. However, the present invention incorporates into the bi-directional energizing circuit means for introducing a time delay to the path being rendered conducting, with the delay approximately equaling the time which is required for the current in the path which is rendered non-conducting to essentially become zero, thereby preventing the development of a short circuit.

Other features and advantages will hereinafter appear.

Figure 1:
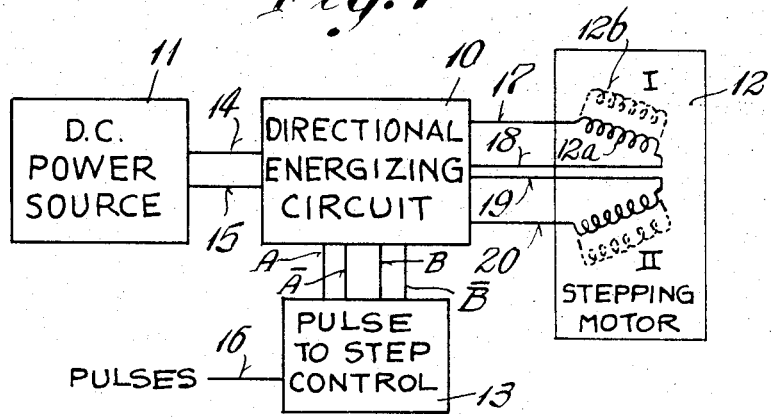
FIG. 1 is a block diagram of a stepping motor and associated circuits including the bi-directional energizing circuit of the present invention.

Referring to FIG. 1, the bi-directional energizing circuit of the present invention is generally indicated by the reference numeral 10 and is used to control the power from a D.C. power source 11 to a stepping motor 12 under the direction of a pulse-to-step control 13. The D.C. power source 11 is essentially a constant current source and is more fully disclosed in the above-noted U.S. Pat. No. 3,505,579, with leads 14 and 15 having unidirectional current therein.

The pulse-to-step control 13 is disclosed in U.S. Pat. No. 3,280,395 and it functions to accept pulses on a lead 16 and effects a change in the energization of its output leads A, $\bar{A}$, B, and $\bar{B}$ for each pulse. The changes are according to the sequence A$\bar{B}$, $\bar{A}\bar{B}$, $\bar{A}$B, AB, A$\bar{B}$, etc., to advance the motor a plurality of steps in one direction, while reversing the sequence reverses the direction of movement of the motor.

The motor 12 is of the type disclosed in the above-noted two U.S. Patents and it is formed to have a first phase I and a second phase II with each phase consisting of a serial connection of the windings on alternate poles. If the motor is of the type which has each winding unitary, then only the winding 12a for phase I will be present; while, if the motor is of the type having bifilar windings, then winding 12a consists of a series connection of one coil on each pole while the other coils of the same poles are also serially connected together as indicated by the winding 12b and then connected in parallel with phase 12a. It will be understood that the coils of each bifilar winding, instead of being serially connected together and then in parallel (as 12a and 12b), may be individually connected in parallel at each pole and then serially connected together.

The energizing circuit 10 is connected to the windings by leads 17–20 with energization of the leads 17 and 18 causing all windings in phase I to be energized, while energization of leads 19 and 20 will cause all windings in phase II to be energized. All four leads are maintained energized at all stepping positions of the motor so that all the windings in the motor will thus be maintained energized.

Figure 2:
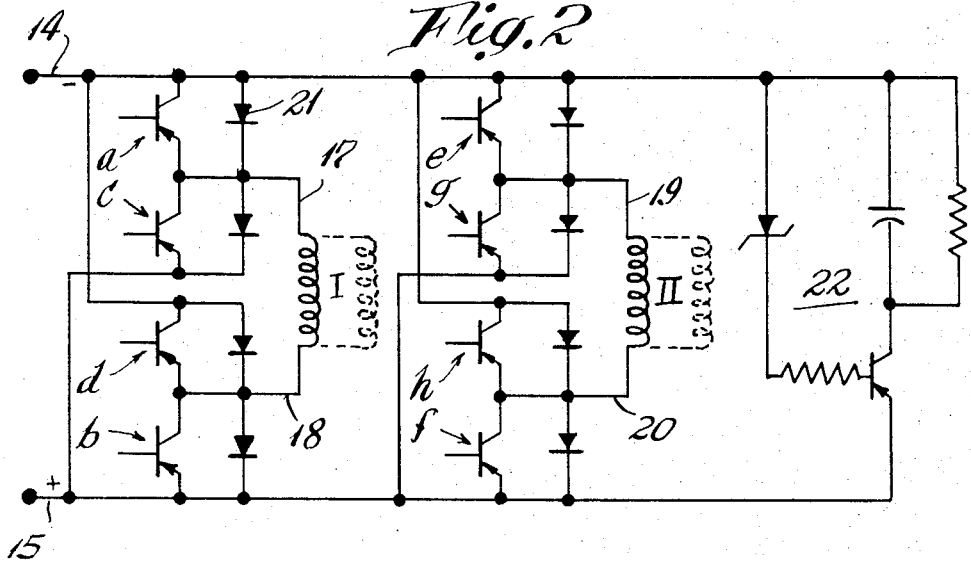
FIG. 2 is an electrical schematic diagram showing the interconnections between portions of the bi-directional energizing circuit and the winding phases of a stepping motor.

In FIG. 2, the interconnection of the leads 17–20, phases I and II and the power source leads 14 and 15 are shown. The bi-directional energizing circuit directs the current to phase I windings in one direction from plus lead 15 to minus lead 14 by a path which includes a transistor a, lead 17, phase I windings, lead 18 and a transistor b. For conducting current to phase I windings in the opposite direction, there is provided a path that includes a transistor c, lead 17, phase I windings, lead 18 and transistor d to the lead 14. Similarly, for the phase II windings, there is a first conducting path which includes transistors e and f, while the path for conducting current in the opposite direction through the phase II windings includes transistors g and h.

Diodes, such as diode 21, are connected as shown to provide a path for currents due to voltages induced in the windings by the change of current flow therein during the transfer interval. As a further precaution against harm which high value induced voltages may cause, there is provided a peak clipper generally indicated by the reference numeral 22, which is connected across the leads 14 and 15 and serves to short circuit values of induced voltages above a predetermined maximum level.

In operating the motor 12 to effect steps in response to pulses on the lead 16, the pulse-to-step control 13 provides, through the bi-directional energizing circuit, the above-noted sequence of energization on leads A through B. The phases are energized according to the sequence I II, I $\bar{II}$, $\bar{I}$ $\bar{II}$, $\bar{I}$ II, I II, where a phase with a line thereover indicates current direction through the phase opposite to current direction through the phase without a line thereover. For energizing the phases for the first sequence I II, when the control leads energization is AB, transistors a and b for phase I and transistors e and f for phase II are conducting. For the next step in the motor sequence, A$\bar{B}$, transistors a and b are maintained conducting for phase I, while transistors g and h are rendered conducting and transistors e and f non-conducting. For the next step, when control leads $\bar{A}\bar{B}$ are energized, only transistors c, d, g and h are conducting, while for the final step of $\bar{A}$B only transistors c, d, e and f are conducting. Accordingly, the bi-directional circuit 10 energizes the motor in the same sequence and at the same rate as commanded by the pulse-to-step control 13 to accordingly produce the same number of steps and at the frequency which the pulses on the lead 16 command.

Figure 3:
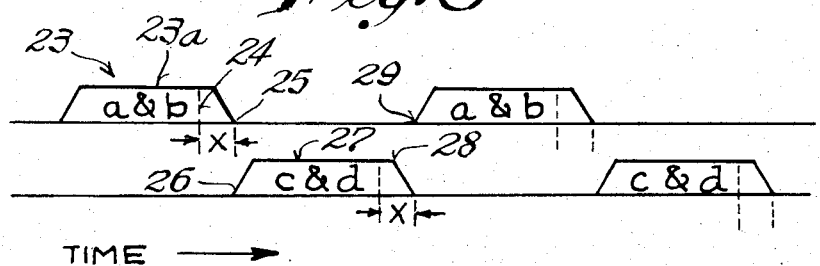
FIG. 3 is a representation of the value of current flow with respect to time in the pair of paths of one phase.

Referring to FIG. 3, there is shown, using time as a base and zero voltages as a reference, the values of the current flow through the transistors a and b and the transistors c and d. The first line 23 indicates the value of current increasing to a level 23a relatively rapidly when the transistors a and b are rendered conducting. Upon causing the transistors a and b to be non-conducting at a point 24, the current in the path that includes the transistors a and b will decrease to zero as at 25. However, it will require a time interval to decrease to zero, as indicated by the reference character X, and this is caused by the storage and fall time inherent in a transistor of relatively high power capacity. Though the pulse-to-step control 13 provides directions to simultaneously cease conduction of the path having transistors a and b and initiate conduction in the path having transistors c and d, the bi-directional circuit of the present invention withholds the rendering of conduction of transistors c and d for a period which substantially equals the time X. Thus, though the transistors a and b were directed to be non-conducting at point 24, transistors c and d are made conducting at a point 26, which essentially corresponds in time to the point 25. The current in the path having transistors c and d will then build up to a level 27, which is numerically equal to the level 23a.

Similarly, for the next change of energization of phase I, the command from the pulse-to-step control 13 appears where indicated by the reference numeral 28, but the time for the current in the path of transistors c and d to decrease to essentially zero is again indicated by the reference character X. However, the beginning indicated by the reference numeral 29 of conduction of the path having transistors a and b is delayed for approximately the X time period. Accordingly, the bi-directional energizing circuit of the present invention not only prevents both paths to a phase from being simultaneously rendered conducting, but also assures that, before rendering one path conducting, the current flow in the path being rendered non-conducting has substantially decreased to zero.

Moreover, the prevention of simultaneous conduction is done in such a manner as will be herein understood as to enable the motor 12 to respond essentially instantaneously to the directions from the control 13. The time period X varies not only with different transistors but also with the quantity of current being controlled thereby, with a typical period being on the order of 50 microseconds for 10 amperes for a germanium transistor.

Figure 4:
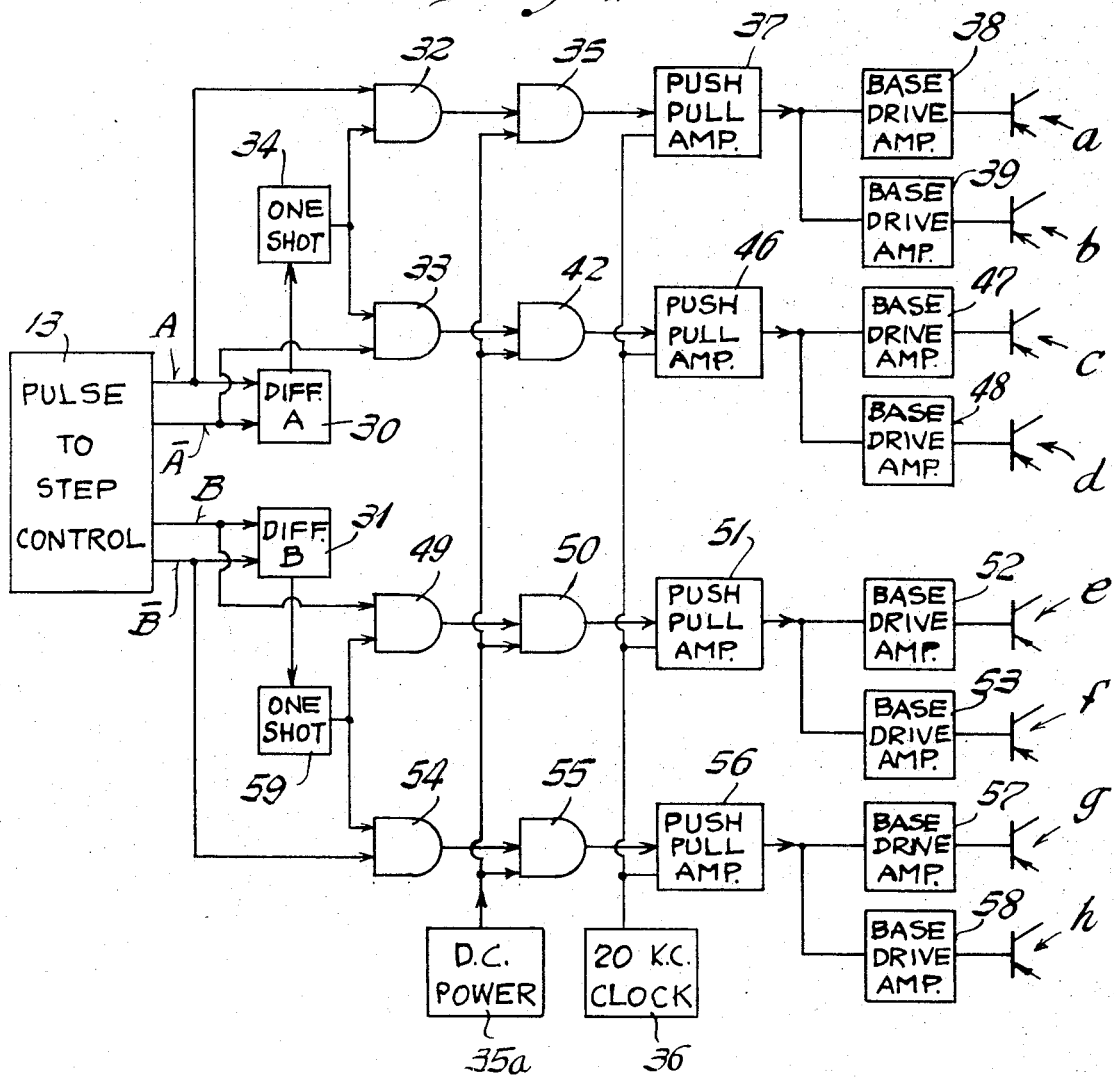
FIG. 4 is a block and logic diagram of the bi-directional energizing circuit.

Referring to FIG. 4, there is shown a block and logic diagram for causing the transistors $a$–$h$ to be rendered conducting and non-conducting, as heretofore indicated. The pulse-to-step control 13 is indicated as having its leads A and $\bar{A}$ connected to a differentiator A, while the leads B and $\bar{B}$ are connected to a differentiator B indicated by the reference numerals 30 and 31, respectively. The leads A and $\bar{A}$ control the conduction in the windings of phase I and lead A is connected as an input to an AND gate 32, while the lead $\bar{A}$ is connected as an input to an AND gate 33. The output of the differentiator A 30 is applied to a monostable multivibrator or one shot 34, whose output is applied as the other inputs to the AND gates 32 and 33.

The differentiator A 30, upon receipt of a change of energization in the leads A and $\bar{A}$, which are basically changes in voltage level on the leads, produces to the one shot 34 a voltage pulse rather than a voltage level. The one shot 34 upon receipt of a pulse shifts the voltage level in its output from a 1 state to 0 state for a duration of time which is essentially equal to the time period X mentioned in connection with FIG. 3, and thereafter the output voltage level of the one shot 34 returns to its 1 state. Accordingly, when the voltage level from the motor control of the lead $\bar{A}$ is changed from 1 to 0 and the lead A from 0 to 1 at the AND gate 32, there is an instantaneous 1 from the lead A and a 1 a time period X later from the one shot 34. The output of the AND gate 32 is thus delayed by the time period X from going to 1.

The AND gate 32 has an output which is one of the inputs to another AND gate 35, which has as its other input unidirectional power from a D.C. source 35a so that it functions basically as a D.C. amplifying switch. A 20kc clock 36 has essentially a square wave output at that frequency and constitutes an input to a push-pull amplifier 37. The output of the AND gate 35, with the input from the AND gate 32 being 1 by having both of its inputs a 1, and the clock 36 producing a square wave having voltage levels of 1 and 0 will accordingly produce at the output of push-pull amplifier 37 an alternating square wave which shifts its direction of conduction at a frequency corresponding to the frequency of the clock.

The square wave output of the push-pull amplifier is directed to a base drive amplifier 38 and also to another base drive amplifier 39. The amplifier 38 is connected to the base of transistor $a$ and provides a base voltage which controls its conduction, while the base amplifier 39 is connected to the base of transistor $b$ and produces a voltage thereat which controls its conduction.

Figure 5:
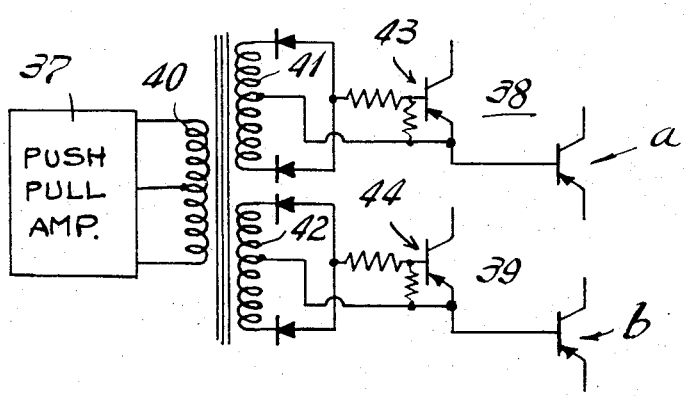
FIG. 5 is a block and schematic diagram of a base drive amplifier shown in block form in FIG. 4.

Referring to FIG. 5, the output of the push-pull amplifier 37 is connected to a center-tapped primary winding 40 of a transformer having a first center-tapped secondary winding 41 and a second center-tapped secondary winding 42. A voltage in the winding 41 is rectified by the rectifiers shown and, when applied to the base of a transistor 43, renders it conducting to supply a voltage to the base of transistor $a$ to also cause it to conduct. Similarly, the secondary winding 42 supplies a rectified unidirectional voltage to the base of a transistor 44 which causes it to conduct and in turn apply a voltage at the base of transistor $b$ to cause it to conduct. It will be understood that as both transistors $a$ and $b$ must be rendered conducting simultaneously and concurrently that, by having both of their base drive amplifiers 38 and 39 connected to the same push-pull amplifier 37, such operation is assured. Also, though the output of the push-pull amplifier to the primary winding 40 consists of an alternating wave of relatively high frequency that is rectified, there is basically supplied a constant value of unidirectional voltage at the base of the transistors 43 and 44 because of the reaction time of the components and because it is a square wave.

Referring again to FIG. 4, it will be understood that while transistors $a$ and $b$ are maintained conducting, transistors $c$ and $d$ are caused to be non-conducting by reason of the lead $\bar{A}$ supplying to the AND gate 33 a 0 voltage level signal which provides a 0 input to an AND gate 45. Even though the other input to the AND gate 45 is from the D.C. power source 35a, the output of the AND gate 45 will continually be a 0, which in turn prevents the producing of a square wave output by a push-pull amplifier 46 which is connected by base drive amplifiers 47 and 48 to transistors $c$ and $d$. The transistors $c$ and $d$ are thus maintained non-conducting.

The control circuitry for the transistors $e, f, g$ and $h$ is identical to the circuitry for the transistors $a$–$d$ and thus includes an AND gate 49 having one input connected to the lead B and an output connected as an input to an AND gate 50, which in turn is connected to a push-pull amplifier 51, the latter having its output connected to base drive amplifiers 52 and 53 for the transistors $e$ and $f$. Similarly, the lead $\bar{B}$ is connected to an AND gate 54 having its output connected as an input to an AND gate 55, which in turn is connected to a push-pull amplifier 56 whose output is connected to base drive amplifiers 57 and 58 for transistors $g$ and $h$. A one shot 59 similar to the one shot 34 is connected to the differentiator B 31 and also has its output be an input to the AND gates 49 and 54. The D.C. power 35a is further connected to provide inputs to the AND gates 50 and 55 while the clock 36 provides an input to the push-pull amplifiers 51 and 56.

The various components in the logic circuit having the same function have the same construction and hence the circuit includes many duplicate parts. It is pointed out, however, that the power supply to the base drive amplifiers is not identical in absolute values in view of the requirement that there be maintained a relative difference voltage between base and emitter of the transistors in the base drive amplifiers, such as the transistors 43 and 44. Thus, the power supply to the base drive amplifiers for transistors $b, c, f$ and $g$ may be the same, while the power supply to the base drives and of the remaining transistors is different. For example, in one application, the power to the base drive amplifier for transistor a is −6 volts with respect to the voltage in the lead 17 which, if assumed to be 0, is thus −6 volts in absolute terms. Additionally, the transistor $d$ is connected to the lead 18, which is at 40 volts and requires that the base drive amplifier for transistor b be about −34 volts. Such power supplies are generally referred to as floating power supplies and are used to provide constant relative voltages between two points where one of the points may vary with respect to other points in the circuit.

In the operation of the circuit it is desired to maintain both phase I and phase II windings energized at all times, except for the slight transition period when the direction of current through a phase is changed.

With the phases being energized in the sequence I II, I $\overline{\text{II}}$, $\overline{\text{I}}$ $\overline{\text{II}}$, $\overline{\text{I}}$ II, I II, transistors a through h are energized in the sequence of abgh, abef, cdef, cdgh, abgh, etc. Assuming the first step of the sequence, the transistors a and b are rendered conducting by both inputs to the AND gate 32 being 1, and the input to the AND gate 35 being 1, so that the inputs to the push-pull amplifier 32 are a steady D.C. and a shifting 1 and 0 from the clock, thereby causing the push-pull amplifier 37 to effect operation of the base drive amplifiers 38 and 39 of the transistors a and b. Similarly, the AND gate 49 has two 1 inputs, the AND gate 50 has 1 so that the inputs to the push-pull amplifier 51 are a steady D.C. and shifting 1 and 0, with the result that the push-pull amplifier 51 produces a square wave output to energize the base drive amplifiers 52 and 53 of transistors e and f.

Upon the step-to-pulse control 13 shifting to the next sequence where the lead A is maintained energized, the lead $\overline{\text{B}}$ deenergized and the lead B energized, the elimination of the 1 input to the AND gate 49 immediately ceases operation of the push-pull amplifier 51 to stop conduction of transistors e and f, though as shown in FIG. 3 there is a slight time delay in the decay of current flow through these transistors. The differentiator 31 applies to the one shot 59 a pulse simultaneously with the change of energization of the leads B and $\overline{\text{B}}$, the one shot provides a 0 level on the AND gate 54 for a period of time approximating the time for the current to decrease to essentially zero in the other path and then reverts to its normal state to place a 1 at the input of the AND gate 54. This causes the push-pull amplifier 56 to become operative, rendering transistors g and h conducting to effect the second step of the sequence.

For the third step, the lead $\overline{\text{B}}$ is maintained energized, while the lead $\overline{\text{A}}$ is deenergized and the lead A energized. This places 1 on the AND gate 33 and a 0 on the AND gate 32 causing the transistors a and b to be rendered non-conducting. Shortly thereafter, at a time determined by the one shot 34, the AND gate 33 has two 1 inputs causing the push-pull amplifier 46 to become operative and rendering the transistors c and d conducting. It will be understood that the push-pull amplifiers, when there is no power from their associated AND gate, do not operate, as the input D.C. power thereto is absent.

It will thus be seen that the bi-directional energizing circuit changes the energization of the motor windings at the same frequency and sequence as directed by its step-to-pulse control 13, and hence the motor operates as if the pulse-to-step control were controlling the motor. The time delay introduced by the one shots 34 and 59 merely shortens, by a very small period, the length of time that the windings are energized and does not alter the frequency or direction of the change.

It has been found that the use of the bi-directional energizing circuit with a bifilar motor renders the motor more efficient, especially at lower speeds, by energizing all the motor windings at the same time, because at low speeds (0 to 2000 steps per second) the copper losses in the windings tend to predominate over iron losses in the stator poles. While it is desired to force as much current through the windings as possible, the amount of heating and heat dissipation which occurs serves as an upper limit for the amount of current and hence limits the output torque of the motor. However, by having both bifilar windings in each phase connected in parallel, it has been found that the resistance of the windings is decreased by half, which enables almost 40 percent more current to be forced through the motor windings as compared to only energizing one coil of each winding with the same temperature rise of the motors. This not only increases the output torque of the motor substantially, but also, as this type of motor has a tendency to resonate at very low speeds, i.e., 0 to 100 steps per second, the higher torque in the lower speed range tends to damp out and minimize this tendency, thereby producing a more stable motor. Moreover, with a motor having only a unitary winding on each pole, the bi-directional energizing circuit of the present invention enables the motor to be operated at a much faster speed than it was capable using heretofore known mechanical switching arrangements.

Variations and modifications may be made within the scope of the invention and portions of the improvements may be used without others.

I claim:

1. An energizing circuit for a stepping motor having a plurality of windings with all the windings being connected into either a first phase or a second phase with a change in energization of one of the phases producing an incremental movement and in which each change consists of a reversal of current flow through a phase comprising a source of unidirectional current, pulse-to-step control means for providing signals to produce a change of energization and a bi-directional energizing means interconnected between the source and the phases to control current flow through the phases from the source under the direction of the pulse-to-step control means, said bi-directional energizing means having for each phase a first path for directing current flow from the source through the phase in one direction and a second path for directing current flow from the source through the phase in the other direction, means for rendering each path conductive or nonconductive and means for preventing simultaneous operation of more than one path including means for delaying after receipt of a signal from the pulse-to-step control the initiation of a path from becoming conductive and means for initiating terminating the conduction in one path essentially simultaneously with the receipt of a signal.

2. The invention as defined in claim 1 in which each path includes a transistor having an inherent time delay in ceasing conduction upon initiation of termination so that current flows in one path after initiating termination of conduction for a short period and in which the means for delaying provides a time that approximates the short period.

3. The invention as defined in claim 1 in which the pulse-to-step control means has a pair of leads for each phase with the signal for a change of energization being a change in voltage levels on the leads, in which the means for rendering the paths conductive or non-conductive includes logic means in each path, there being one lead connected to one logic means and in which the logic means is responsive to only one voltage level on its lead to effect conduction and is responsive only to the other voltage level to effect non-conduction.

4. The invention as defined in claim 3 in which the logic means in each path includes a gate having a pair of inputs, in which the one lead is connected to the one input, in which the delaying means is operatively connected to the leads and has an output connected to each of the other gate inputs and in which the delaying means output is altered for a time period after a change of voltage levels on the leads.

5. The invention as defined in claim 1 in which the source has two leads with a switching means connected between the source and the phase to provide two switching means in each path and in which the means for rendering the paths conductive or non-conductive includes means for simultaneously identically altering the state of conduction of both switching means.

* * * * *